Patented Aug. 29, 1933

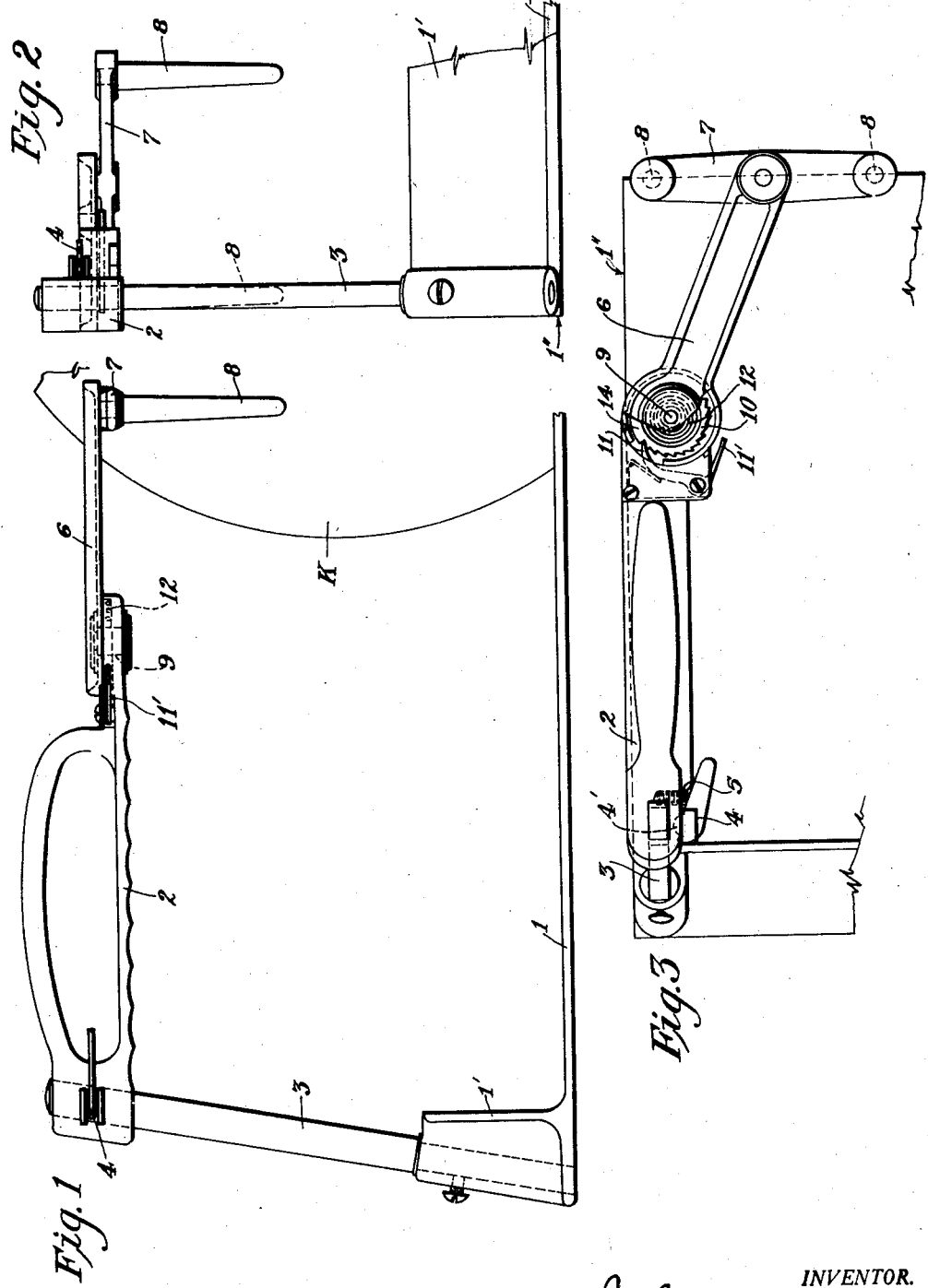

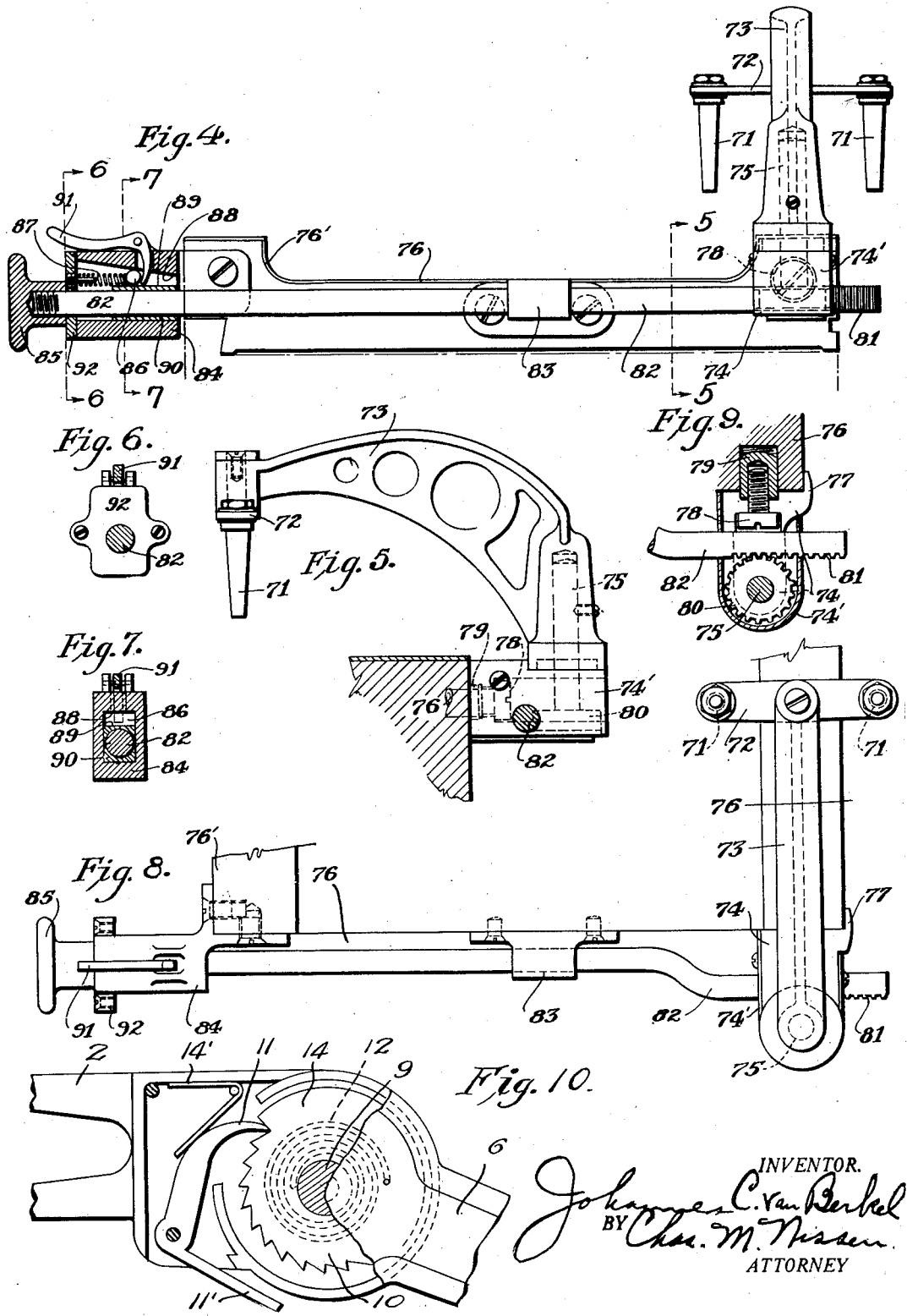

1,924,667

UNITED STATES PATENT OFFICE 1,924,667

SLICING MACHINE

Johannes Cornelis van Berkel, Copenhagen, Denmark, assignor to Naamlooze Vennootschap Maatschappij tot Veraardiging van Snijmachines volgens Van Berkel's Patent en van andere Werktuigen, Rotterdam, Netherlands, a limited liability company of the Netherlands Application December 12, 1928, Serial No. 325,456, and in Great Britain January 9, 1928

21 Claims. (Cl. 146—217)

This invention relates to machines for slicing meat and other substances and of the kind in which the substance to be sliced is clamped upon a support capable of being fed towards a slicing knife adapted to rotate about a stationary axis, the substance support being mounted on a carriage adapted to be moved to and fro past the knife so that slices can be cut in succession.

The means for clamping the substance on the support usually comprises a clamping bar or equivalent (hereinafter referred to as a "clamp"), which can be forced down into effective gripping engagement with the upper surface of the substance. It is found in practice that the clamps in use at the present day are incapable of holding the substance sufficiently rigid during slicing, especially where large pieces of substance are being sliced, the reversals of movement of the carriage and the pressure of the knife on the front end of the substance causing distortion thereof, the rear end being prone to shift across the support. It will be apparent that, should such distortion take place from time to time, the slices would not be of uniform thickness, this being undesirable and, therefore, being regarded as a disadvantage.

The object of the present invention is to obviate this disadvantage, and, to this end, in accordance with the invention, there is combined with the substance support in a machine of the kind referred to a clamp disposed at or near the front of the support for clamping the substance thereon and means for engaging and supporting one side, or both sides, of the substance at a part thereof behind the clamp in order to prevent distortion of the substance during slicing, which means can be freely adjusted towards the substance and held against the side of the substance.

Another object is to provide an automatic locking means for preventing return movement of the supporting means for the side of the substance.

Further objects will appear as the description proceeds.

In order that the invention may be clearly understood, it will now be described with reference to the accompanying drawings, in which several embodiments thereof, chosen by way of example, have been illustrated. In the drawings:—

Figs. 1 and 2 are elevations of one kind of substance support, to which one form of the invention is shown applied, and Fig. 3 is a plan view of Fig. 1, certain parts in Fig. 3 being broken away;

Fig. 4 is a sectional elevation of a substance support having a different embodiment of the invention applied thereto;

Figs. 5, 6 and 7, respectively, are sections taken on the lines 5—5, 6—6 and 7—7 of Fig. 4;

Fig. 8 is a fragmentary plan view of Fig. 4;

Fig. 9 is a detail section of part of Fig. 8; and

Fig. 10 is an enlarged view of the parts shown in Fig. 3.

Referring to Figs. 1 to 3, the substance support therein shown comprises what is commonly known as a "display tray", indicated by the numeral 1, and is provided with a substance clamp 2 and an inclined, upright guide 3, on which the clamp 2 is slidably, but not turnably, mounted. The tray 1 has an upstanding flange 1' extending along one side thereof and serving as an abutment for the substance. The arm 2 is fitted with a friction pawl 4 having an eccentric face 4' which bears against the guide 3, the pawl being urged normally by a spring 5 to wedge the face 4' hard against the guide 3 and so lock the arm in the position occupied by it for the time being. An extension 6 is pivotally mounted at the free end of the arm 2 and a bar 7 is in turn pivotally mounted at the free end of the extension 6.

Two substance engaging members in the form of posts 8 depend from the ends of the bar 7. The pivotal connection between the arm 2 and the extension 6 consists of a pin 9 penetrating holes in both parts. In addition, a ratchet-wheel 10 is secured to the extension 6, a spring-urged pawl 11 co-operating with the ratchet wheel is mounted on the arm 2, and a volute spring 12 fitted around the pin 9 normally urges the extension 6 to occupy a position in which one or other of the ratchet teeth bears hard against the pawl 11. With this arrangement, the extension 6 may be swung clockwise (as viewed in Fig. 3) against the torque of the spring 12 into any desired position, the extension being held against retrograde movement by the pawl-and-ratchet device. The pawl 11, however, can be withdrawn at will from engagement with the ratchet teeth by pressing a finger-piece 11' projecting from the pawl.

As shown, the ratchet teeth do not extend entirely around the wheel 10, but are interrupted by a projection 14 serving to limit the counter-clockwise movement of the extension 6, the arrangement being such that the bar 7 cannot move beyond the edge 1'' of the tray and so cannot foul the knife K of the slicing machine.

It will be noted from the enlarged view of the pawl and ratchet mechanism shown in Fig. 10, that the projection 14 is higher than the ratchet teeth. In other words, it would be necessary to raise the pawl 11 higher to clear the projection 14 than is necessary to have the pawl clear the ratchet teeth. Therefore, the finger piece 11' is spaced from the casing which encloses the ratchet a distance sufficient to permit the pawl to be moved out of the path of the ratchet teeth when the finger piece is moved into engagement with the said casing, but not enough to permit the pawl to be raised sufficiently to clear the projection 14. In other words, when the finger piece 11' is moved against the casing to release the arm 6, the arm will be moved by the action of the spring 12 into the position shown in either Figs. 3 or 10, but will be prevented from moving any farther by means of the projection 14, thus preventing the clamping member from moving past the plane of the knife. Thus, a very effective means is provided for releasing the clamping means and for preventing said clamping means from fouling the knife.

When the substance support is in use, the substance to be sliced is placed on the tray 1 against the flange 1', the arm 2 being disposed above the level of the top substance. The extension 6 is then swung clockwise into a position in which the substance is gripped between the posts 8 and the flange 1'. Thereafter, the friction pawl 4 is released and the arm 2 is pressed down on top of the substance. On account of the inclination of the guide 3, the posts 8 will move nearer to the flange 1', with the result that the substance will be gripped much more firmly between the posts and the flange.

The display tray is adapted to be fitted in place on a slicing machine in known manner, and, when so fitted and when the machine is operated, the tray will be fed by well-known means either automatically or by hand towards the slicing knife K of the machine, the substance being at the same time moved recurrently past the knife whereby slices are cut in succession. When the operation of slicing is finished, the tray may be removed from the machine and placed in a position (e. g. in a shop-window) in which the substance is to be displayed.

Referring now to Figs. 4 to 10, the substance-gripping posts therein shown are substantially similar in function to those shown in Figs. 1 to 3, but are adapted to be operated differently. The posts, which are indicated by the numerals 71, depend from the ends of a bar 72 pivoted midway of its length to the free end of an arm 73. A bracket 74 suports the arm 73, which is secured to an upright pivot pin 75 journalled in the bracket 74. The bracket 74 is fitted to the feed-table 76 at the rear end thereof, the bracket having a projection 77 bearing against one side of the feed-table and being secured by a screw 78 to a plug 79 screwed into the rear end of the feed-table, the bracket being centred on said plug. A pinion 80, secured to the pin 75, meshes with rack teeth 81 at one end of a round bar 82 slidably mounted in bearing brackets 83, 84 on the feed-table. The pinion 80 is enclosed in a casing 74' on the bracket 74.

It will be obvious that, by sliding the bar 82 endwise through its bearing brackets, the pinion 80 will be turned and the pin 75 and arm 73 will turn in unison therewith.

Such endwise sliding movements can be imparted to the bar 82 by means of a knob 85 secured to the end thereof opposite to the rack teeth 81. By pulling the knob 85, the posts 71 can be swung (in the counter-clockwise direction as viewed in Fig. 17) hard against the side of the substance to be sliced. It should be noted that the bar 72 is free to turn about its pivot so that it can adopt a position in which both posts bear against one side of the substance. The other side of the substance may be placed against a step 76' on the feed-table. If desired, the step 76' may be extended to present an uprising flange similar to that shown in Fig. 1.

In order to maintain the posts 71 in firm engagement with the substance, a braking device is provided to prevent retrograde movement of the bar 82. This device is fitted to the bearing bracket 84 and consists of a roller 86 which is normally pressed by a spring 87 between an inclined face 88 on the bracket 84 and a face 89 on a collar 90 secured to the bar 82. Any tendency of the bar 82 to move towards the right of Fig. 13 will cause the roller 86 to become more tightly wedged between the faces 88 and 89 and, as a result, the bar will be rigidly locked. The roller 86 may be rendered inoperative by raising a bell-crank-lever 91, the toe of which is capable of displacing the roller along the face 89 clear of the face 88.

The collar 90 and a plate 92 on the bracket 84 serve as limiting stops defining the ends of the range of the endwise movement which may be imparted to the bar 82.

It is to be understood that a clamp (such for example as that shown in Fig. 1) would be provided on each of the substance supports in Figs. 4 to 10.

Obviously those skilled in the art may make various changes in the details and arrangement of parts without departing from the spirit and scope of the invention as defined by the appended claims and I therefore, do not wish to be restricted to the precise construction herein disclosed.

I claim:—

1. In a slicing machine having a substance support, a clamp at the forward end of said support, an arm pivoted at one side of and adjacent the rear of said support about an upright axis to swing over said support, a member depending from said arm to engage the side of the substance sliced, mechanism for rotating said arm, actuating means for said mechanism remote from said arm, and latch mechanism for holding said actuating means in adjusted position.

2. In a slicing machine having a substance support, a clamp at the forward end of said support, an arm pivoted at one side of and adjacent the rear end of said support, a member depending from said arm to engage the side of the substance sliced, a slidable rod extending across said support to the side opposite said arm, gearing associated with said arm and rod to rotate said arm by sliding said rod, a latch normally preventing movement of said rod toward the side of the table upon which said arm is pivoted, and means for releasing said latch.

3. A substance clamp for slicing machines comprising a clamping arm for clamping a substance against vertical movement and an arm pivotally mounted on said clamping arm and being adjustable into a plurality of positions to one side of said clamping arm to engage the side of said substance against lateral movement.

4. A substance clamp for slicing machines comprising a clamping bar, an arm movably supported on said bar, and substance engaging means on said arm, said clamping bar and arm being adjustable into and out of engagement with the substance to be clamped, said arm being adjustable towards said substance in a direction transversely to the direction in which said bar is moved to engage said substance.

5. A clamp comprising a clamping bar movable vertically into and out of engagement with the substance to be clamped thereby, and auxiliary clamping means mounted on said bar and movable in a horizontal direction to engage said substance being clamped.

6. A substance clamp comprising a support, an abutment on said support, an upwardly extending inclined member at one side of said abutment, a clamping bar thereon, and means supported on said clamping bar for clamping the substance against said abutment as said bar is moved downwardly along said inclined member.

7. In a substance clamp for slicing machines, the combination with a support of an inclined upwardly extending guide on said support, an abutment on said support, a clamping member slidable along said inclined guide, and means on said member for engaging the side of a substance on said support, said last mentioned means being movable towards said abutment as said clamping member moves along said guide.

8. A slicing machine comprising a support for the substance to be sliced, an upright on said support, a clamping bar slidable along said upright into and out of engagement with the substance to be clamped, an arm pivoted to said bar, means operatively connected to said bar and arm for preventing accidental relative movement of said arm and bar in one direction while permitting free relative movement in the other direction, and clamping means on said arm adapted to move in a horizontal direction when said bar is moved along said upright.

9. A substance clamp for slicing machines comprising an inclined guide, a clamping bar slidable along said guide into and out of engagement with the substance to be clamped, means for holding said bar in adjusted position along said guide, and a clamping member pivoted to said bar and having projections thereon for engaging the substance at spaced points along the side of said substance when said clamping bar is moved downwardly along said guide.

10. In a clamp for slicing machines, the combination with a support of a pivoted clamping arm mounted for substantially horizontal movement and spaced projections on said arm fixed with respect to each other but freely movable relatively to said arm in a substantially horizontal direction and adapted to engage the substance when placed on said support at spaced intervals along said substance.

11. In a clamp for slicing machines the combination with a substance support of a clamping member for clamping a substance on said support to prevent movement thereof in a vertical direction, an arm pivoted to said clamping member and adapted to move in a substantially horizontal plane towards and away from the substance being clamped, means for locking said arm against movement relative to said member in one direction while permitting relative movement thereof in the opposite direction, and means for preventing movement of said arm into a position where the same is intersected by the cutting plane of the knife.

12. A substance clamp for slicing machine comprising a pivoted arm, means for moving said arm about its pivot in one direction, pawl and ratchet means for preventing movement of said arm in said last mentioned direction, means for releasing said pawl and ratchet means, and means on said ratchet adapted to engage said pawl for limiting the extent of movement of said arm under the influence of said first mentioned means while said releasing means is in releasing position, comprising an abutment arranged to engage said pawl even when said pawl is raised clear of said ratchet.

13. A substance clamp for movement into engagement with the side of a substance to prevent movement of said substance in a horizontal direction, comprising an arm pivoted to swing in a horizontal direction, a rack bar adapted to engage a pinion operatively connected to said arm, means for moving said rack bar to rotate said arm in a horizontal direction, a releasable means for preventing movement of said rack bar in a reverse direction, comprising a cam surface mounted on a relatively rigid support, and a wedge member positioned between said cam surface and said rack bar.

14. A substance clamp for movement into engagement with the side of a substance to prevent movement of said substance in a horizontal direction, comprising an arm pivoted to swing in a horizontal direction, a rack bar adapted to engage a pinion operatively connected to said arm, means for moving said rack bar to rotate said arm in a horizontal direction, a releasable means for preventing movement of said rack bar in a reverse direction, comprising a cam surface mounted on a relatively rigid support, and a wedge member positioned between said cam surface and said rack bar, said wedge member being yieldingly held in engagement with said cam surface and rack bar to increase the frictional contact therebetween.

15. In a slicing machine, the combination with a substance support, of a vertically movable clamp mounted at the forward end of said support for movement into and out of operative engagement with the upper side of the substance to be clamped, an arm mounted on said clamp for substantially horizontal movement thereon, a downwardly projecting member on said arm adapted to engage the side of the substance being sliced, and means for locking said arm in adjusted position with respect to the substance being sliced.

16. In a slicing machine, the combination with a support, of a clamp mounted at the forward end of said support for engaging the upper side of the substance to be clamped, an arm pivoted on said clamp to swing rearwardly over said support into engagement with the side of the substance to be clamped, and means for locking said arm in said position.

17. In a slicing machine, the combination with a substance support, of a clamp mounted at the forward end of said support and adapted to move into and out of engagement with the upper side of a substance to be clamped, an arm pivoted on said clamp to swing rearwardly over said support, a downwardly projecting member on said arm to engage the side of the substance to be sliced, and means for automatically locking said arm in engagement with the side of said substance against return movement away from said substance.

18. In a slicing machine, the combination with a substance support, of a clamp mounted at the forward end of said support for preventing upward movement of the substance mounted thereon, a member pivoted on said clamp to swing rearwardly thereof, releasable ratchet mechanism for preventing return movement of said member from its rearward position, and a downwardly extending projection on said member for engaging the side of the substance being sliced.

19. In a slicing machine, the combination with a substance support, of a clamp mounted at the forward end of said support for clamping the substance against vertical movement, an arm pivoted on said clamp adapted to swing rearwardly over said support and toward the substance to be sliced, a bar pivoted on said arm, downwardly projecting members on said bar to engage the side of the substance being sliced, and means for locking said arm in said adjusted position.

20. In a clamp for slicing machines, the combination with a support, of a pivoted clamping arm mounted for substantially horizontal movement and having spaced projections thereon extending downwardly toward the substance support and in a direction substantially perpendicular to the horizontal movement of said arm, said projections being relatively long and freely movable relatively to said arm in a substantially horizontal direction and being arranged to engage the side of the substance on said support at spaced intervals along said substance in a direction perpendicular to the feeding movement of the substance.

21. In a clamp for slicing machines, the combination with a substance support, of a clamping member for clamping a portion of a substance on said support to prevent shifting movement of that portion thereof in a vertical direction, an arm pivotally mounted on said support and movable in a substantially horizontal direction over said support, a plurality of fingers extending downwardly from said arm and movably mounted on said arm to be freely movable in a horizontal direction relative to said arm when said fingers contact with said substance, means for locking said arm against movement away from the substance to be clamped while permitting relative movement thereof toward said substance to bring said fingers into engagement with the substance being sliced, said fingers being movable into engagement with a portion of the substance arranged a substantial distance away from said clamping member in the direction of feed of said substance as the same is fed during a slicing operation, said fingers preventing lateral shifting movement of the substance during a slicing operation.

JOHANNES CORNELIS van BERKEL.